United States Patent
Karam

(10) Patent No.: US 10,393,017 B2
(45) Date of Patent: Aug. 27, 2019

(54) SYSTEM AND METHOD FOR REDUCING SPECIFIC FUEL CONSUMPTION (SFC) IN A TURBINE POWERED AIRCRAFT

(71) Applicant: Rolls-Royce Corporation, Indianapolis, IN (US)

(72) Inventor: Michael Abraham Karam, Plainfield, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 2 days.

(21) Appl. No.: 15/452,334

(22) Filed: Mar. 7, 2017

(65) Prior Publication Data

US 2018/0258848 A1    Sep. 13, 2018

(51) Int. Cl.
*F02C 6/16* (2006.01)
*F02K 3/06* (2006.01)
*B64D 41/00* (2006.01)
*H02K 7/18* (2006.01)

(52) U.S. Cl.
CPC .............. *F02C 6/16* (2013.01); *B64D 41/00* (2013.01); *F02K 3/06* (2013.01); *H02K 7/1823* (2013.01); *F05D 2220/50* (2013.01); *F05D 2220/76* (2013.01); *F05D 2260/42* (2013.01); *Y02E 60/15* (2013.01); *Y02T 50/53* (2013.01)

(58) Field of Classification Search
CPC ..... F02C 3/04; F02C 6/00; F02C 6/16; B64D 41/00
See application file for complete search history.

(56) References Cited

U.S. PATENT DOCUMENTS

| | | |
|---|---|---|
| 4,077,202 A | 3/1978 | Schutze |
| 6,647,708 B2 | 11/2003 | Bornhoft et al. |
| 7,246,482 B2 | 7/2007 | Mahoney et al. |
| 7,406,828 B1 | 8/2008 | Nakhamkin |
| 9,003,763 B2 | 4/2015 | Coney |
| 9,297,304 B2 | 3/2016 | Nordstrom et al. |
| 2006/0213183 A1* | 9/2006 | Althaus ............... F01D 25/305 60/274 |
| 2011/0094236 A1* | 4/2011 | Finkenrath .............. F02C 6/16 60/772 |
| 2012/0119020 A1* | 5/2012 | Burns ..................... B64D 27/00 244/58 |
| 2012/0153076 A1* | 6/2012 | Burns ..................... B64D 27/16 244/58 |
| 2014/0223918 A1* | 8/2014 | Coney ..................... F01K 23/10 60/774 |
| 2014/0238039 A1* | 8/2014 | Zhang ..................... F02C 7/236 60/778 |

(Continued)

*Primary Examiner* — Sean Gugger
(74) *Attorney, Agent, or Firm* — Duane Morris LLP

(57) ABSTRACT

A system for providing auxiliary power in an aircraft. A propulsion core comprises a compressor, a combustor, a turbine, and a shaft. An accessory unit comprises an accessory combustor, an accessory turbine, and an accessory shaft. A tank is configured to hold high pressure air and operably connected to the accessory unit. An electric generator comprises an electrical output and a mechanical input, with the mechanical input operably connected to the accessory shaft and the electrical output operably connected to an electric motor operably connected to the shaft. The electrical output is operably connected to an auxiliary power consuming device in the aircraft.

15 Claims, 6 Drawing Sheets

(56) References Cited

U.S. PATENT DOCUMENTS

| | | | |
|---|---|---|---|
| 2014/0248121 A1* | 9/2014 | Karam | F02C 7/045 |
| | | | 415/1 |
| 2015/0337737 A1* | 11/2015 | Fingleton | F02C 3/107 |
| | | | 290/31 |
| 2016/0252015 A1* | 9/2016 | Kusumi | F03D 9/00 |
| | | | 290/40 B |
| 2016/0333731 A1* | 11/2016 | Zhang | F02C 7/228 |
| 2017/0036773 A1* | 2/2017 | Jones | B64D 31/06 |
| 2017/0211474 A1* | 7/2017 | Sennoun | F02C 3/305 |
| 2017/0291712 A1* | 10/2017 | Himmelmann | F02C 6/00 |
| 2017/0314464 A1* | 11/2017 | Wang | F01D 17/02 |
| 2018/0051701 A1* | 2/2018 | Kupiszewski | F04D 25/06 |

\* cited by examiner

SYSTEM AND METHOD FOR REDUCING SPECIFIC FUEL CONSUMPTION (SFC) IN A TURBINE POWERED AIRCRAFT

CROSS REFERENCES

This application is related to and incorporates by reference U.S. Patent Publication No. 2014/0248121.

BACKGROUND

As aircraft systems continue to develop more focus is on reducing both emissions and fuel consumption, in conjunction with the goal of reducing operational and capital costs. These goals may be achieved by increasing efficiencies of systems and/or optimizing systems for a given mission. The disclosed subject matter addresses these needs with a system that allows optimization of accessory power unit sizing, operation and energy recovery in conjunction with low cost power augmentation in the form of onboard high pressure air.

Typically, prior art aircraft employ one or more primary power systems responsible for propulsion, the primary power systems also power subsystems or accessory devices, such as the electrical, hydraulic, environmental, navigation and control systems. Prior art aircraft also include an auxiliary power unit (APU) for supplying power to the accessory systems when the primary power systems are not available. The APU's are used when the aircraft is on the ground or when the aircraft is operating at lower speeds or altitudes, at cruise the primary power systems provide all the power required by accessory systems and the APU is dead weight.

Generation of power for accessory systems by the primary power systems are also complicated by the variable speeds which the primary power systems operate over the course of a mission. This variation requires additional power conditioning equipment to ensure usable electrical power to the accessory systems, which increases both capital and operational costs. In aircrafts, every pound in equipment is a pound lost in payload, which corresponds to lost performance or profit.

SUMMARY

Embodiments of the present subject matter are presented herein as unique aircraft power systems. Additional embodiments include apparatuses, systems, devices, hardware, methods, and combinations for reducing emissions, fuel consumption, operational and capital costs. Further embodiments, forms, features, aspects, benefits, and advantages of the present application shall become apparent from the description and figures provided herewith.

According to an aspect of the present disclosure, a system for providing auxiliary power in an aircraft comprises a propulsion core, an accessory unit, a tank, and an electric generator. The propulsion core comprises a compressor, a combustor, a turbine, and a shaft. The accessory unit comprises an accessory combustor, an accessory turbine, and an accessory shaft. The tank is configured to hold high pressure air and operably connected to a high pressure air supply line between the tank and the accessory unit. The electric generator comprises an electrical output and a mechanical input, the mechanical input operably connected to the accessory shaft and the electrical output operably connected to an electric motor operably connected to the shaft and the electrical output operably connected to an auxiliary power consuming device in the aircraft.

In some embodiments an exhaust of the propulsion core is in thermal contact with the high pressure air between the tank and the accessory unit. In some embodiments the system further comprises a heat exchanger creating thermal contact with the exhaust and the high pressure air. In some embodiments the high pressure air supply line provides high pressure air to the accessory combustor. In some embodiments the system further comprises a fluid passage between the accessory unit and the combustor, and the fluid passage is configured to provide accessory unit exhaust into the combustor.

In some embodiments the shaft operably powers a propulsion fan, lift fan or propeller. In some embodiments the system further comprises a high pressure air controller between the high pressure air tank and the combustor. In some embodiments the system further comprises an electrical controller between the electrical output and the electric motor. In some embodiments the accessory unit further comprises an accessory compressor.

According to another aspect of the present disclosure, a method of power management in an aircraft is disclosed. The aircraft has a propulsion core, an accessory turbine, and an accessory load. The method comprises determining a maximum accessory load requirement of the aircraft; driving a generator with the accessory turbine to generate an electrical output as a function of the maximum accessory load requirement; maintaining the electrical output of the generator substantially constant; and dividing the electrical output of the generator between the accessory load and an auxiliary motor operably connected to a shaft of the propulsion core. The electrical output to the auxiliary motor is a function at least of the maximum accessory load requirement and an instantaneous accessory load demand.

In some embodiments the method further comprises injecting high pressure air from an onboard high pressure air tank into an accessory combustor of the accessory turbine. In some embodiments the method further comprises pre heating the high pressure air with exhaust from the propulsion core prior to injection into the combustor of the accessory turbine. In some embodiments the method further comprises injecting an exhaust of the accessory turbine into a combustor of the propulsion core.

In some embodiments the method further comprises charging the high pressure air tank from a source external to the aircraft. In some embodiments the method further comprises regulating the injection of high pressure air and/or fuel into the accessory combustor to maintain the electrical output of the generator. In some embodiments the method further comprises sizing the generator and accessory turbine as a function of the maximum accessory load requirement.

According to yet another aspect of the present disclosure, a method for reducing the specific fuel consumption for an aircraft mission is disclosed. The method comprises predetermining characteristics of the aircraft mission; injecting high pressure air from an onboard tank into a combustor of a power turbine; and controlling the rate of injection of the high pressure air into the combustor of the power turbine as function at least of the mass of the high pressure air in the onboard tank and predetermined characteristics of the mission.

In some embodiments the method further comprises heating the high pressure air with exhaust from the aircraft's primary propulsion system prior to injection into the combustor and injecting exhaust from the power turbine into a core combustor of the aircraft's primary propulsion system.

In some embodiments the method further comprises determining an expected duration of the mission; determining the amount of high pressure air available in the onboard tank, and determining a discharge mass flow rate of the high pressure air such that exhaustion of the high pressure air substantially corresponds to the end of the mission.

In some embodiments the method further comprises regulating the fuel supply rate to the power turbine at least as a function of the discharge mass flow rate. In some embodiments the method further comprises further converting work output of the power turbine into electricity and providing electricity to the aircraft's auxiliary systems. In some embodiments the method further comprises driving the aircraft's primary propulsion system with the electricity not utilized by the auxiliary systems.

DETAILED DESCRIPTION

Figure 1:
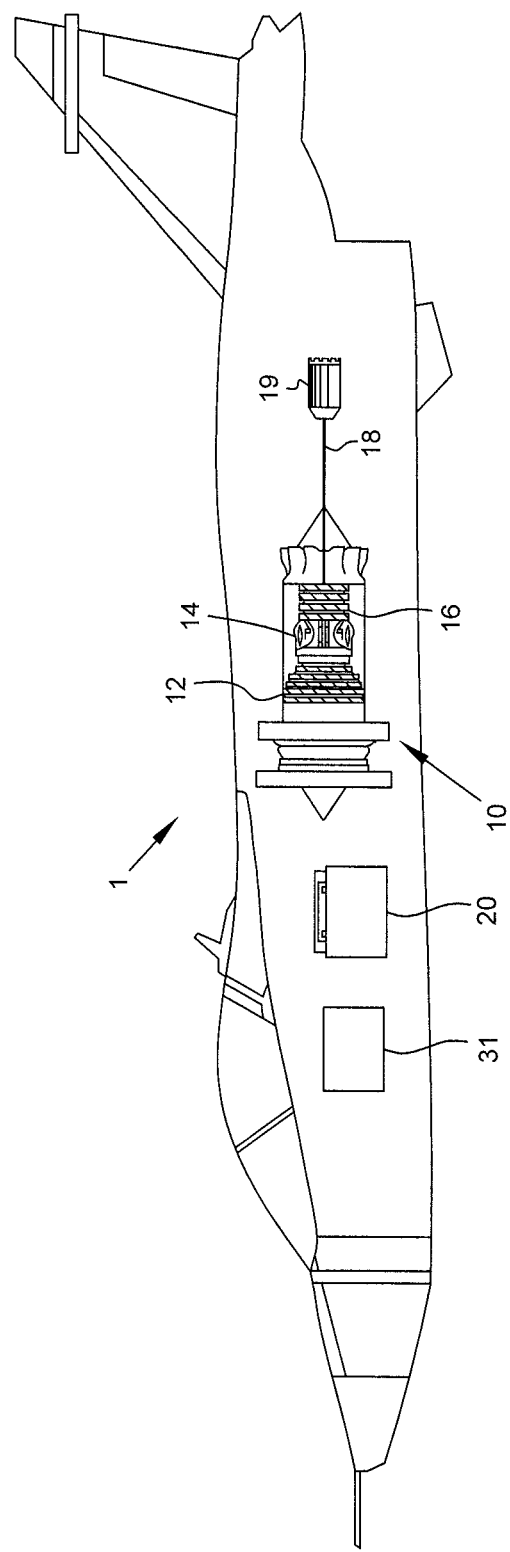
FIG. 1 depicts an aircraft with a power system according to some embodiments of the disclosed subject matter.

For the purposes of promoting an understanding of the principles of the subject matter, reference will now be made to the embodiments illustrated in the drawings and specific language will be used to describe the same. It will nevertheless be understood that no limitation of the scope of the subject matter is thereby intended. Any alterations and further modifications in the described embodiments, and any further applications of the principles of the subject matter as described herein are contemplated as would normally occur to one skilled in the art to which the subject matter relates.

With reference to FIG. 1, an aircraft 1 is shown with gas turbine 10 as a primary power source used to provide propulsive power to the aircraft 1 as to achieve or maintain a flight condition. While the primary power source may take many forms and may include multiple engines, the primary power source is preferably a gas turbine, and thus the subject matter will be discussed with respect to such engine.

The illustrative embodiment in FIG. 1 depicts aircraft engine 10 as a gas turbine engine and is shown including a compressor 12 for compressing air, a combustor 14 for burning a mixture of fuel and the compressed air, and a turbine 16 used to expand the combusted mixture of fuel and air. The turbine 10 has a shaft 18 and an electrical drive motor 19. Though the gas turbine engine 10 is shown as a single spool turbojet engine, other embodiments can include additional numbers of spools and can take other forms such as turbofan, turboprop, or turboshaft. In some embodiments the gas turbine engine 10 can be an adaptive cycle and/or variable cycle engine. It is contemplated that the engine 10 can have other variations and forms other than the few listed above.

Figure 2:
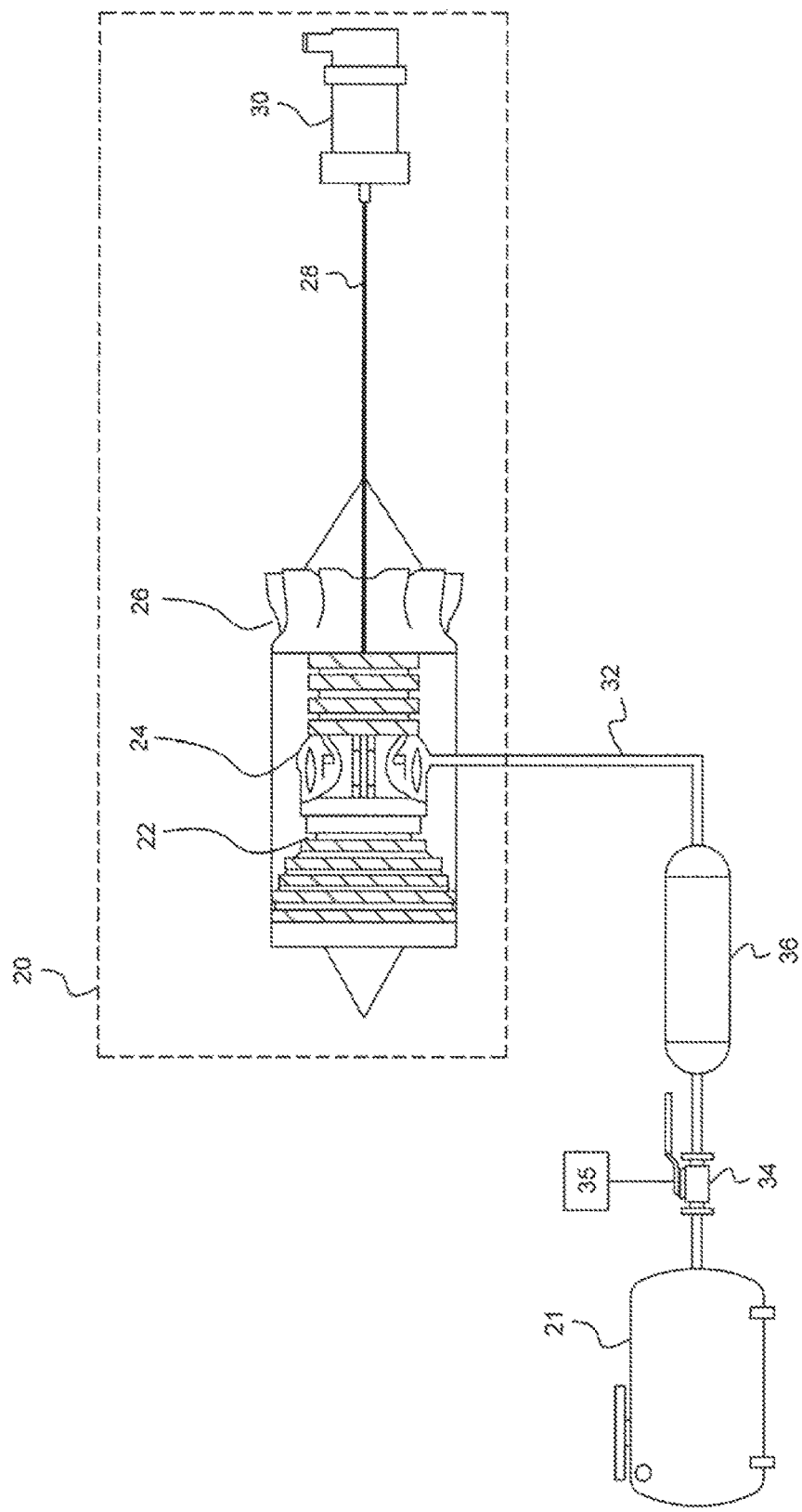
FIG. 2 depicts an accessory power unit and high pressure air tank according to embodiments of the disclosed subject matter.

The aircraft 1 as shown in FIG. 1 also includes an accessory power unit 20 and a high pressure air tank 21. The accessory power unit 20 and high pressure air tank 21 are shown in FIG. 2. The accessory power unit 20 has a combustor (burner) 24, turbine 26 and output shaft 28, in addition to an optional compressor 22 that may be incorporated. The output shaft as shown is connected to an electrical generator 30. The accessory power 20 unit provides power to the aircraft's non-propulsion subsystems 31 as well as in some modes the propulsion subsystems. The high pressure air tank 21 is connected to the combustor 24 of the accessory power unit 20 via supply lines 32. In addition, a valve 34 for controlling the discharge of the high pressure air and a heat exchanger 36 are in the path between the tank and the combustor 24. The heat exchanger 36 pre-heats the high pressure air prior to injection. While FIG. 2 shows only one high pressure air tank 21, the high pressure air tank 21 may comprise multiple tanks connected with multiple supply lines.

Figure 3:
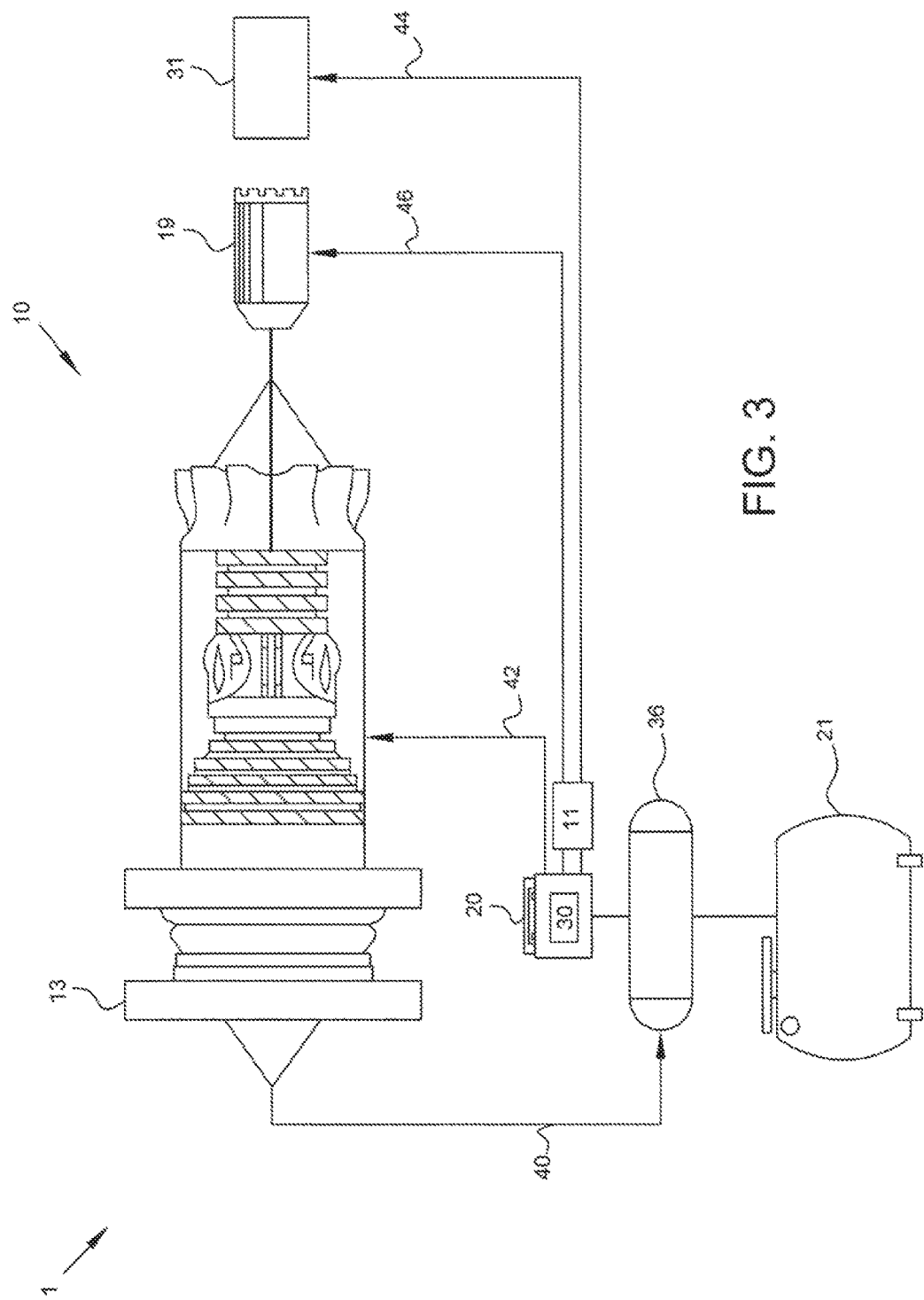
FIG. 3 depicts an arrangement of a primary power system, an accessory power unit and a high pressure air tank according to an embodiment of the disclosed subject matter.

FIG. 3 is a diagram of the interaction between the primary propulsion source, turbine engine 10, the accessory power unit 20 and high pressure air tank 21. The output of both the turbine engine 10 and the accessory power unit 20 include both useable power and heat. Utilizing an open topping cycle like arrangement, exhaust from the turbine engine 10 is fed through passage 40 into the heat exchanger 36 to pre-heat the high pressure air prior to injection into the accessory power unit 20. Likewise the exhaust from the accessory power unit 20 is directed into the combustor 14 of turbine engine 10 via passage 42. In this manner the disclosed arrangement recovers some of the energy previously lost. U.S. Patent Publication No. 2014/0223918 and U.S. Pat. No. 9,003,763, incorporated herein by reference, describe the thermodynamic gains in a terrestrial system with respect to a topping cycle that are applicable to an open system as described herein.

As illustrated in FIG. 3 the accessory power unit 20 in addition to outputting heat energy, also via the generator 30 outputs electrical power which is supplied to the aircraft's subsystems 31 via supply line 44 and is supplied to the drive motor 19 via supply line 46. The generator 30 further advantageously includes an electrical (power) controller 11 for distributing the power between the subsystems 31 and drive motor 19.

FIG. 3 also shows the operable relationship described above between the high pressure air tank 21, heat exchanger 36 and the accessory power unit 20. The heat exchanger 36 may be direct in which case exhaust heat is directly transferred to the high pressure air, or indirect in which a secondary fluid is used to exchange energy between the two. The shaft 18 drives a propeller, fan, lift fan, rotor, or pump collectively shown as reference number 13 to provide propulsion to the aircraft 1, or drives a generator or pump which in turn drives a propeller, fan, lift fan, rotor or pump 13.

Figure 4:
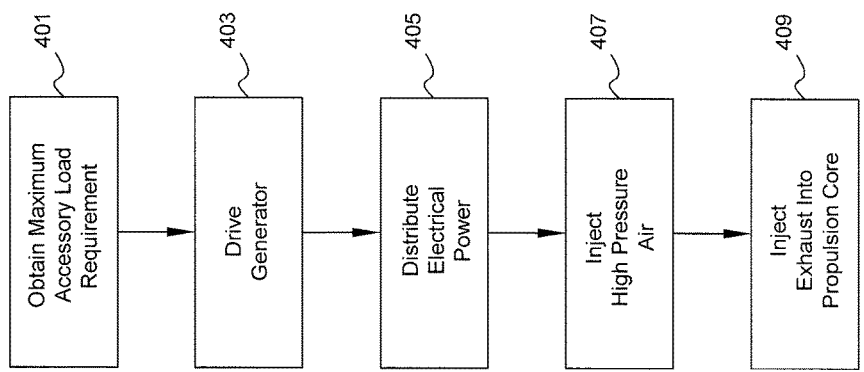
FIG. 4 depicts a flow chart for managing power from the generator of an accessory power unit according to some embodiment of the disclosed subject matter.

FIG. 4 is illustrative of a flow chart for managing the power in the aircraft 1. The maximum accessory load requirement of the aircraft if not known for a given aircraft 1 is determined, upon which the accessory power unit 20 may be sized as shown in Block 401. The load requirement may be a function of the maximum load of each of the non-propulsive subsystems 31 of the aircraft 1 plus a safety factor, or may be refined to be a function of the maximum load of all subsystems that would be concurrently in operations plus a safety factor. This maximum load requirement is preferably a function of the aircraft and not of a particular mission, as the sizing and optimum state of the accessory power unit 20 particular to the aircraft is based upon this requirement during the design or retrofitting stage.

The accessory power unit 20 during operation of the aircraft 1 drives the generator 30 to create a constant electrical power output as shown in Block 403. The generator 30, along with the accessory power unit 20, are advantageously matched to operate at a set optimum speed and power output. The generator 30 may be directly driven by the accessory power unit 20 or via a gearbox. Preferably the combination of accessory power unit 20 and generator 30 run at a constant rpm selected as a function of the set's efficiency.

The constant electrical output from the generator 30 is distributed between the subsystem load 31 and the auxiliary electric motor 19 which is connected to the shaft 18 of the propulsion core (turbine engine 10) as shown in Block 405. The generator set (accessory power unit 20 and generator 30) runs constantly at its most efficient power setting independent of the instantaneous demand from the non-propulsion subsystems 31, resulting in reductions in SFC of around 2%. Electric energy produced and not consumed by the non-propulsion subsystems 31 is distributed to the propulsion core via the drive motor 19, thus reducing the fuel requirements of the turbine engine 10. The constant input and output from the generator 30 eliminates need for a separate intermittently used APU and power conversions from rpm dependent output frequencies/voltages from prior art propulsion core generators.

As shown in Block 407, high pressure air is injected into the combustor 24 of the accessory power unit 20 and preferably the injected air is preheated by the exhaust from the turbine engine 10. The introduction of heated pressurized air into the combustor reduces the amount of work extracted from the accessory turbine 26 by the compressor 22 (if present) and reduces the SFC of the accessory power unit 20 while maintaining the power output of the generator set in comparison to operations in which high pressure and heated high pressure injection as described herein is not utilized. The injection of high pressure air can result in a 5-15% reduction in SFC for the accessory power unit 20. The injection of high pressure air into the auxiliary power unit 20 may also be controlled to adjust for operating conditions which effect the SFC of the auxiliary power unit 20 such as, humidity, temperature, pressure, flow disruptions, oxygen depletion or airborne particles.

Injecting the exhaust from the accessory power unit 20 into the combustor 14 of the turbine engine 10 as shown in Block 409 may also increase SFC of the turbine engine 10 approximately 2% depending on the relative size of the accessory power unit 20 and the turbine engine 10.

Figure 5:
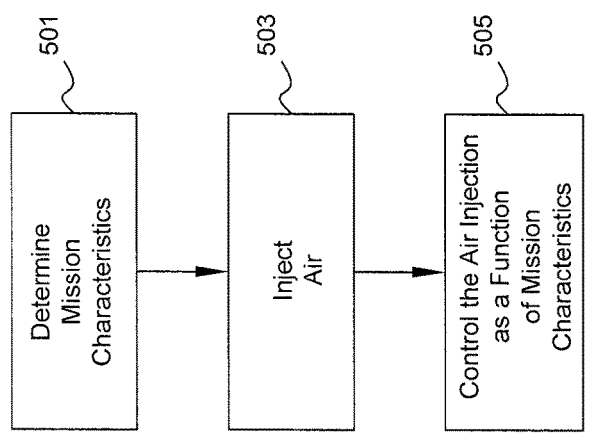
FIG. 5 illustrates a flow chart for reducing SFC based on a mission according to an embodiment of the disclosed subject matter.

As illustrated in FIG. 5, the SFC of an aircraft can advantageously be reduced by controlling the injection of the high pressure air as a function of the mission (flight plan). Characteristics of the aircraft mission are predetermined as shown in Block 501. The predominated characteristic of the mission being duration, however other characteristics may include required reserve, contingent operations, subsystem loads, demand surges. From the onboard tank 21, high pressure air is injected into the accessory power unit 20, as shown in Block 503 and controls the air as a function shown in Block 505. The rate of injection (discharge rate) of the high pressure air into the combustor 24 of the power turbine is preferably controlled as function at least of the mass (or capacity) of the high pressure air in the onboard tank and at least one predetermined characteristic of the mission.

Determining the mission characteristics further includes: determining an expected duration of the mission, determining the amount of high pressure air is available, and determining the injection pressure of the high pressure air. It is preferable that in determining a discharge mass flow rate of the high pressure air based on the mission characteristics, the exhaustion of the high pressure air substantially corresponds to the end of the mission, exclusive of reserve air. High pressure air not used or held in reserves amounts to a lost opportunity for SFC savings in both the auxiliary power unit 20 and the turbine engine 10, as well as increased carried dead weight.

As discussed previously, the exhaust from the accessory power unit 20 may advantageously be injected into the combustor of the turbine engine 10 as well as heating the high pressure air with exhaust from the aircraft's primary propulsion system prior to injection into the combustor. In response to the high pressure air injection, the fuel supply rate to the accessory power unit 20 may be reduced at least as a function of the discharge mass flow rate. Alternatively, or in conjunction, if a compressor 22 is included in the auxiliary power unit 20, the mass flow rate of air provided by the compressor 22 of the accessory power unit 20 may also be reduced as a function of the discharge mass flow rate. Likewise, the fuel to the primary propulsion unit 10 may also be reduced in response to the high pressure air injection.

As described above, the work output of the accessory power unit 20 is converted into electricity and provided the aircraft's non-propulsion subsystems 31. The electricity not utilized by these subsystems 31 is utilized to drive the aircraft's primary propulsion system (turbine engine 10) via electric motor 19.

While not shown, a dynamic assessment and control of the air discharge rate may also be advantageous. For example, a plane on standby on a hot tarmac may wish to increase the discharge rate to avoid ingesting a large amount of low pressure hot gas into the compressor 22 (if present) which may be detrimental to the efficiency of the accessory power unit 20. Another example of dynamic reassessment may be at the end of a mission, if at which all the air has not been discharged, increasing the discharge rate to ensure it is all used prior to landing and provide excess power to the turbine engine 10 via motor 19. As noted above, ground equipment may quickly and inexpensively recharge the high pressure tank 21 thus obviating the need to continue to maintain a reserve mass or include the optional compressor 22.

Advantageously, the discharge valve 34 is automatically controlled by a controller 35. The controller 35 can include one or more Arithmetic Logic Units (ALUs), Central Processing Units (CPUs), memories, limiters, conditioners, filters, format converters, or the like which are not shown to preserve clarity. In one form, the controller is of a programmable variety that executes algorithms and processes data in accordance with operating logic that is defined by programming instructions (such as software or firmware). Alternatively or additionally, operating logic for the controller can be at least partially defined by hardwired logic or other hardware. In one particular form, the controller 35 is configured to operate as a Full Authority Digital Engine Control (FADEC); however, in other embodiments it may be organized/configured in a different manner as would occur to those skilled in the art. It should be appreciated that the controller can be exclusively dedicated to controlling operation of the discharge valve, or may additionally and/or alternatively be used in the regulation/control/activation of one or more other subsystems or aspects of the aircraft 1.

The high pressure air tank 21 is capable of being pressurized to a variety of pressures and can be any size and/or shape and have a variety of constructions. More than one tank 21 can be provided in any embodiment. The high pressure air tank 21 is capable of being charged with pressurized air while installed on the aircraft 1 or can be removed for servicing from the aircraft 1. In some forms the high pressure air tank 21 can be charged using one or more of the aircraft engines; however, it is contemplated that the high pressure air tank 21 is recharged using another source external to the aircraft 1. The high pressure air tank 21 may also be recharged in flight in some modes of operation and may be recharged while the aircraft 1 is on the ground in others.

As depicted in the illustrative embodiment, a controllable valve 34 (discharge valve) is disposed between the high pressure air in the high pressure air tank 21 and the gas turbine engine 10. An air supply line 32 can be disposed between the high pressure air tank 21 and the valve 34, as well as another air supply line 32 between the valve 34 and the gas turbine engine 10. In some embodiments, the valve 34 may be connected with the tank 21 such that an intermediate air line is not needed. In some embodiments multiple air lines can be connected between multiple valves 34 to couple the high pressure air tank 21 to the accessory power unit 20. The multiple valves 34 can be connected directly to the high pressure air tank 21 or can be connected with multiple air lines. In still other embodiments, more than one air tank 21 can be provided in the aircraft 1.

The valve 34 can take on a variety of forms and can be actuated using a variety of techniques. To set forth just a few examples, the valve 34 can be driven or powered by devices that are mechanical, hydraulic, manual, electrical, electromechanical, or combinations thereof. The valve 34 can be arranged to have only two positions, open or closed, or can be a valve that provides any number of intermediate positions. In addition, the valve 34 can be capable of being commanded to any given position at a common rate in some embodiments and a variety of rates in others. Any variety of flow rates of the pressurized air can be provided through the valve 34. The valve 34 can be a one-time use valve or can be actuated a number of times to different positions. To set forth just a few further examples of variations, the valve 34 can be a ball valve, butterfly valve, check valve, gate valve, needle valve, piston valve, spool valve, or a poppet valve. In some forms the valve 34 can act as a pressure regulator. More than one valve 34 can be provided to admit pressurized air from the high pressure air tank 21 to the accessory power unit 20, in which case the valves 34 can be, but need not be, the same. In embodiments of the aircraft 1 in which multiple valves 34 are used with multiple air tanks 21, not all valves 34 need be the same.

The valve 34 can be controlled by the controller. In one embodiment the controller is capable of providing a signal to open the valve 34. The controller can be used in some embodiments to control the rate at which the valve 34 is opened and/or the position to which the valve 34 is opened and thus the discharge mass flow rate of the high pressure air. In some embodiments the controller is capable of controlling the valve 34 at any variety of positions between an open and closed position. The controller can provide a signal to open and/or close the valve 34 based upon a request received from an operator, such as through a switch located in a cockpit, to set forth just one non-limiting example. In still other embodiments a switch can directly command the valve 34 without the need of the controller. In some embodiments, the controller can monitor aircraft systems and depending on a control algorithm provide signals to the valve 34. Other situations could also give rise to the valve 34 opening and admitting pressurized air into the accessory power unit 20.

The high pressure air tank 21 can be used to provide an increase in mass flow in the auxiliary power unit, above that provided by an optional compressor 22 if present. Consequently, when the mass flow increases the fuel flow can be decrease to maintain the same power output.

The controller can automatically operate the valve 34 prior to command and/or confirmation from the pilot. In these situations, an alert can be provided to the cockpit to notify the crew of the automatic engagement of the system.

Figure 6:
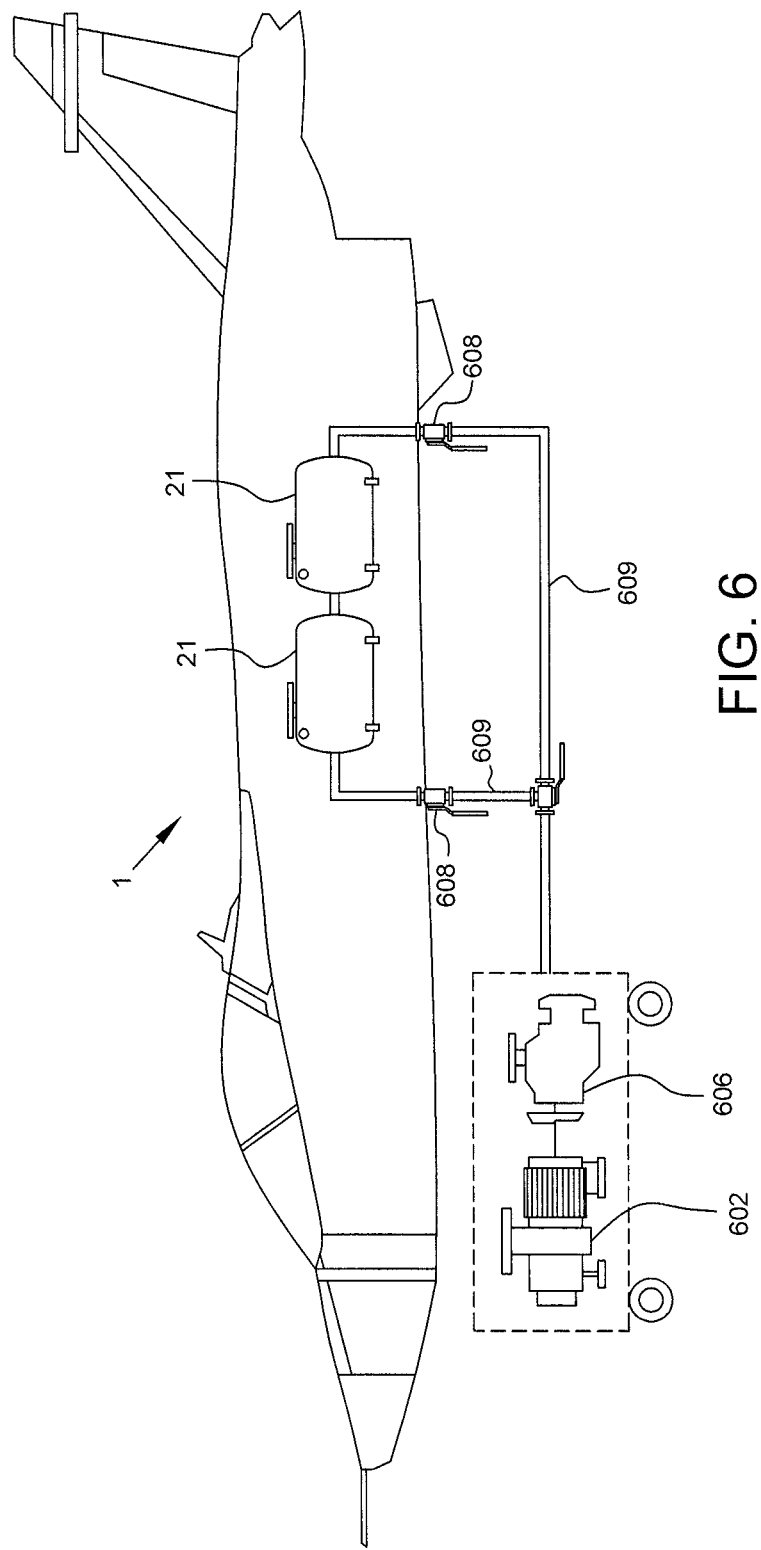
FIG. 6 illustrates the recharge of high pressure air tanks according to an embodiment of the disclosed subject matter.

Turning now to FIG. 6, one form of the present application is shown in which the high pressure air tank 21 can be recharged. The pump 602 can take any variety of forms such as centrifugal pumps, axial pumps, screw pumps, gear pumps, lobe pumps, vane pumps, piston pumps, diaphragm pumps, and plunger type pumps, to set forth just a few non-limiting examples. The pump 602 can be mechanically driven in some embodiments, but in others the pump 602 can be a hydraulic, electrical, or pneumatic driven pump. More than one pump 602 can be used for the high pressure air tank 21. A pump 602 can be used to charge more than one tank 21, in which case some embodiments may include a valve 604 to select between the tanks 21. The engine 606 is preferably ground based and external to the aircraft, such as another aircraft or ground servicing equipment. It is also advantageous that connection valves 608 by which the charging lines 609 are connected are a type of quick connect valves to ensure simple and rapid recharging of the tank 21.

In the illustrative embodiment the primary propulsion core (turbine engine 10) drives an external load which can represent a propeller, fan, pump or a rotor, to set forth some non-limiting examples. Some embodiments need not include an external load in that the acceleration of the air itself through the engine provides the propulsive thrust.

An aspect of the disclosed subject matter as noted previously is the elimination of the compressor 22 for the auxiliary power unit 20 in favor of the high pressure injection. Alternatively, the compressor 22 of the auxiliary power unit 20 may be sized to merely augment the mass flow rate provided by the high pressure air injection or serve in only an emergency situation, in which case it would be designed to deliver only a minimum mass flow. Either the compressor entirely eliminated or with a reduced sized compressor, weight and cost are advantageously further reduced.

As used above, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Similarly, the term "air" can be any suitable fluid which may or may not have the elemental composition of air. It should also be noted that the use of propulsion core, propulsion system and turbine engine are used synonymously throughout. Likewise non-propulsion subsystems, accessory subsystem and accessory loads are also used synonymously.

Although examples are illustrated and described herein, embodiments are nevertheless not limited to the details shown, since various modifications and structural changes may be made therein by those of ordinary skill within the scope and range of equivalents of the claims.

What I claim is:

1. In an aircraft, a system for providing auxiliary power comprising:
   a propulsion core, the propulsion core comprising a compressor, a combustor; a turbine and a propulsion core shaft;
   an accessory unit, the accessory unit comprising an accessory combustor; an accessory turbine and an accessory shaft;
   a high pressure air tank configured to hold high pressure air, the tank operably connected to a high pressure air supply line between the tank and the accessory unit; and,
   an electric generator comprising an electrical output and a mechanical input,
   the mechanical input connected to the accessory shaft;
   the electrical output operably connected to an electric motor; the electric motor operably connected to the propulsion core shaft;
   the electrical output also operably connected to an auxiliary power consuming device in the aircraft;
   further comprising a fluid passage between the accessory unit and the combustor, the fluid passage configured to provide accessory unit exhaust into the combustor while the propulsion core is providing propulsion to reduce Specific Fuel Consumption.

2. The system of claim 1, wherein an exhaust of the propulsion core is in thermal contact with the high pressure air between the tank and the accessory unit.

3. The system of claim 2, further comprising a heat exchanger creating thermal contact with the exhaust and the high pressure air.

4. The system of claim 1, wherein the high pressure air supply line provides high pressure air to the accessory combustor.

5. The system of claim 1, wherein the propulsion core shaft operably powers a propulsion fan, lift fan or propeller.

6. The system of claim 1, further comprising a high pressure air controller between the high pressure air tank and the accessory combustor.

7. The system of claim 1, further comprising an electrical controller between the electrical output and the electric motor.

8. The system of claim 1, wherein the accessory unit further comprises an accessory compressor.

9. A method of power management in an aircraft, the aircraft having a propulsion core, an accessory turbine and an accessory load, the method comprising:
   determining a maximum accessory load requirement of the aircraft;
   driving a generator with the accessory turbine to generate an electrical output as a function of the maximum accessory load requirement;
   maintaining the electrical output of the generator substantially constant; and,
   dividing the electrical output of the generator between the accessory load and an auxiliary motor operably connected to a shaft of the propulsion core;
   wherein the electrical output to the auxiliary motor is a function at least of the maximum accessory load requirement and an instantaneous accessory load demand.

10. The method of claim 9, further comprising injecting high pressure air from an onboard high pressure air tank into an accessory combustor of the accessory turbine.

11. The method of claim 10, further comprising pre heating the high pressure air with exhaust from the propulsion core prior to injection into a combustor of the accessory turbine.

12. The method of claim 9, further comprising injecting an exhaust of the accessory turbine into a combustor of the propulsion core.

13. The method of claim 10, further comprising charging the high pressure air tank from a source external to the aircraft.

14. The method of claim 10, further comprising regulating the injection of high pressure air and/or fuel into the accessory combustor to maintain the electrical output of the generator.

15. The method of claim 10, further comprising sizing the generator and accessory turbine as a function of the maximum accessory load requirement.

* * * * *